United States Patent
Sharma et al.

(10) Patent No.: US 8,711,834 B2
(45) Date of Patent: Apr. 29, 2014

(54) METHOD TO PREVENT HYPER FRAME NUMBER DE-SYNCHRONIZATION IN A WIRELESS COMMUNICATION SYSTEM

(75) Inventors: Neha Sharma, Bangalore (IN); Vinay Kumar Shrivastava, Bangalore (IN)

(73) Assignee: Samsung Electronics Co., Ltd (KR)

( * ) Notice: Subject to any disclaimer, the term of this patent is extended or adjusted under 35 U.S.C. 154(b) by 989 days.

(21) Appl. No.: 12/347,395

(22) Filed: Dec. 31, 2008

(65) Prior Publication Data

US 2009/0168751 A1    Jul. 2, 2009

(30) Foreign Application Priority Data

Dec. 31, 2007    (IN) .......................... 3162/CHE/2007

(51) Int. Cl.
*H04J 3/06*    (2006.01)
*H04B 7/00*    (2006.01)

(52) U.S. Cl.
USPC ............................................ 370/350; 455/517

(58) Field of Classification Search
None
See application file for complete search history.

(56) References Cited

U.S. PATENT DOCUMENTS

| | | | |
|---|---|---|---|
| 2003/0092458 A1* | 5/2003 | Kuo | 455/517 |
| 2006/0281413 A1* | 12/2006 | Burbidge et al. | 455/67.11 |
| 2009/0290545 A1* | 11/2009 | Chun et al. | 370/329 |

* cited by examiner

*Primary Examiner* — John Blanton
(74) *Attorney, Agent, or Firm* — The Farrell Law Firm, P.C.

(57) ABSTRACT

A method for HFN synchronization in a wireless communication system. The method includes toggling an RSN bit value in RESET PDU, after single sided re-establishment of RLC entity. A RESET PDU with the toggled RSN bit value is transmitted to a receiver. The HFN value then updated according to a RESET ACK PDU.

6 Claims, 10 Drawing Sheets

| D/C | PDU Type | RSN | R1 | Oct 1 |
|-----|----------|-----|-----|-------|
| HFNI ||||  |
| HFNI ||||  |
| HFNI ||||  |
| PAD |||| Oct N |

METHOD TO PREVENT HYPER FRAME NUMBER DE-SYNCHRONIZATION IN A WIRELESS COMMUNICATION SYSTEM

PRIORITY

This application claims priority to an application entitled "Method to Prevent HFN Un-Synchronization in a Wireless Communication System", which was filed in the Indian Patent Office on Dec. 31, 2007 and assigned Ser. No. 3162/CHE/2007, the content of which is hereby incorporated by reference.

BACKGROUND OF THE INVENTION

1. Field of the Invention

The present invention generally relates to the field of wireless communication and more particularly, the present invention relates to the methods for preventing HFN de-synchronization due to the interaction between RESET procedure and re-establishment procedure in the RLC layer which handles the ciphering functionality, of a wireless communication system like 3GPP UMTS standards.

2. Description of the Related Art

Universal Mobile Telecommunications System (UMTS) is a third generation (3G) mobile communication system developed in Europe. The UMTS employs Wideband Code-Division Multiple Access (WCDMA) as a radio access technique. WCDMA is a Direct Sequence Code Division Multiple Access (DS-CDMA) technique of a Frequency Division Duplex (FDD) scheme, which transmits data using a bandwidth of 5 MHz in a frequency band of 2 GHz.

Generally, it has been defined that the ciphering and deciphering of data in the UMTS system are performed by a Radio Link Control (RLC) layer. Therefore, in the UMTS system, when a problem related to ciphering and/or deciphering of data occurs upon transmission/reception of data, the interaction of a RESET procedure and the re-establishment procedure can cause Hyper Frame Number (HFN) de-synchronization between sender and receiver of RLC entities. Therefore, with such a service environment, wireless communication systems currently require a method for preventing HFN de-synchronization in the RLC layer.

Figure 1:
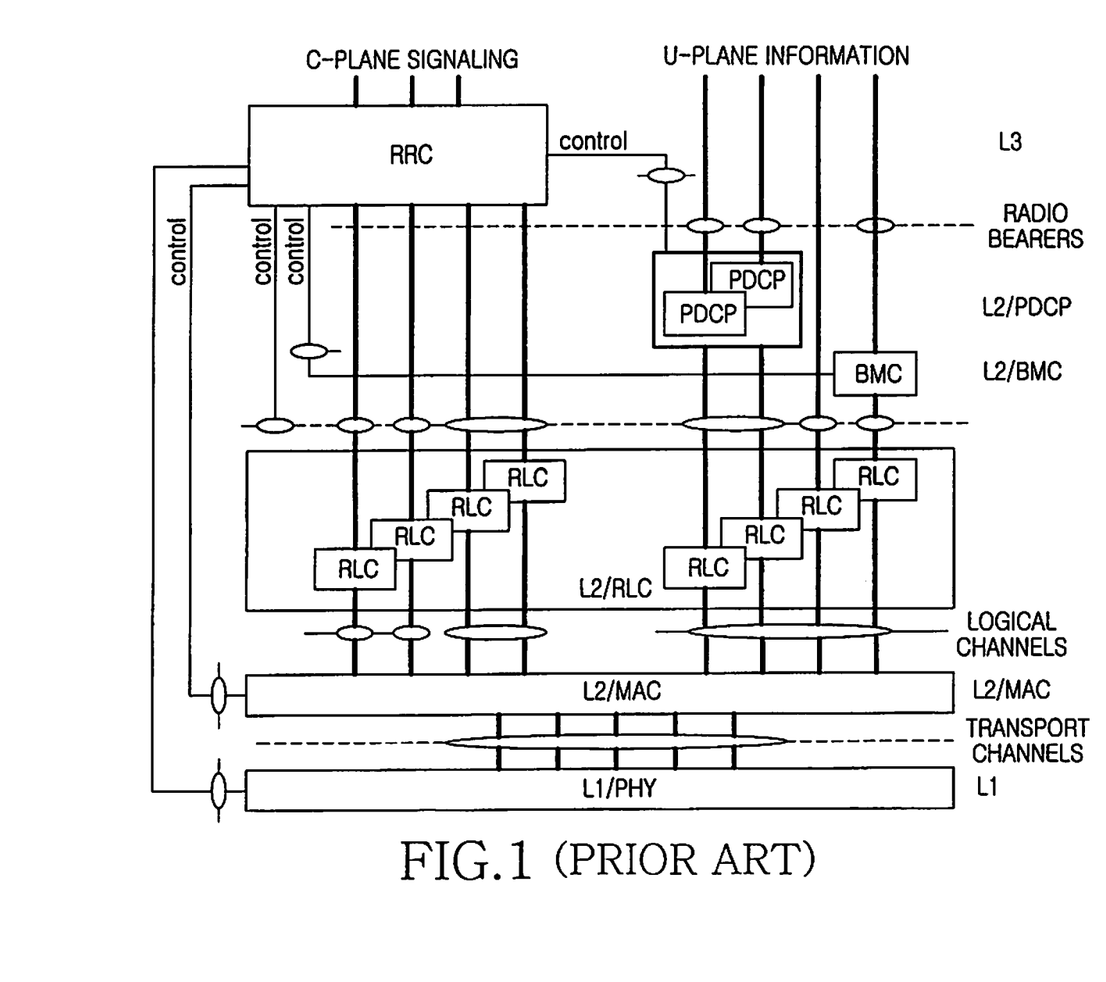
FIG. 1 illustrates a UMTS radio interface protocol architecture.

FIG. 1 illustrates a UMTS radio interface protocol architecture layer proposed for a 3G wireless network and is reproduced from the 3GPP TS 25.301.

Referring to FIG. 1, Layer-1 (L1) or the physical layer of the UMTS radio interface is responsible for coding and modulation of data transmitted over the air. Layer-2 (L2) or the data link layer is subdivided into a RLC sublayer and a Media Access Control (MAC) sublayer. The service provided by layer-2 is referred to as the radio bearer. The control plane radio bearers, which are provided by RLC to Radio Resource Control (RRC), are denoted as signaling radio bearers. The separation in MAC and RLC sublayers is motivated by the need to support a wide range of upper layer services, and also the requirement to provide high efficiency and low latency data services over a wide performance range, i.e. from 1.2 Kbps to greater than 2 Mbps. Other motivators are the need for supporting high Quality of Service (QoS) delivery of circuit and packet data services, such as limitations on acceptable delays and/or data Bit Error Rate (BER), and the growing demand for advanced multimedia services. Each multimedia service has different QoS requirements. The data link layer also includes C-plane signaling and U-plane information for separating the information from control signals.

The RLC layer receives data packets from the higher layers, such as Internet Protocol (IP), through Service Access Point (SAP), and delivers RLC frames to the MAC sublayer. The RLC layer provides three types of SAPs, one for each RLC operation mode, i.e., unacknowledged mode (UM), acknowledged mode (AM), and transparent mode (TM). The RLC frames are queued into logical channels. At the MAC sublayer, the RLC frames are multiplexed onto transport channels. The transport channels are the interface of the physical layer to the data link layer. In fact, data link layer functions are divided in two parts, Physical Layer Independent Convergence Function (PLICF) handled in the RLC, and Physical Layer Dependent Convergence Function (PLDCF) included in the MAC. It is assumed that there is one instance of RLC for each data application/session.

More precisely, a RLC entity is included in the UE and a corresponding RLC entity is included at the UTRAN (network). The operation of the RLC entity at the UE and the network is identical.

RLC layer receives a unit of data often called payload, from the upper layers. This unit of data, or payload, is called a Service Data Unit (SDU). RLC adds control information, called header, for the peer layer to process it. The header combined with the payload is called a Packet Data Unit (PDU).

An AM RLC entity consists of a transmitting side and a receiving side, where the transmitting side of the AM RLC entity transmits RLC PDUs and the receiving side of the AM RLC entity receives RLC PDUs. Whereas a UM or TM RLC entity is either transmitting or receiving type.

The RLC layer is responsible for reliable transmission of the SDUs received from the upper layer. To achieve reliability, a feedback mechanism is used for notifying the transmitter about the reception of the PDUs. It is possible that an RLC PDU may not be received correctly by the peer receiving RLC entity. In such cases, the PDU needs to be retransmitted. The numbers of retransmissions are limited to a preconfigured value MAXDAT. Apart from the feedback on the reverse link, some additional feedback mechanism may be required to report an error detection and if required to do a RESET of the protocol parameters. This feedback may be required on the forward link as well as on the reverse link. All the feedback mechanisms together constitute the control procedures of the RLC. The control procedures are carried out by exchanging control PDUs. An RLC RESET procedure is performed by exchanging RESET and RESET ACK control PDUs between the peer RLC entities.

Figure 2:
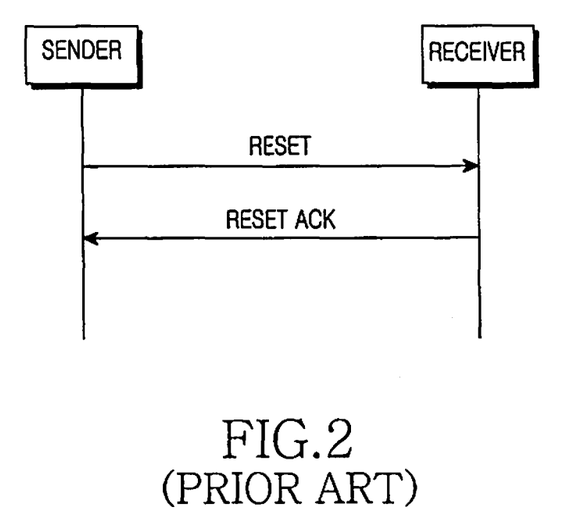
FIG. 2 illustrates an elementary RLC RESET procedure.

FIG. 2 illustrates an elementary RLC RESET procedure as defined by the 3GPP RLC protocol specification. Basically, a sender sends a RESET to a receiver. The receiver should respond with a RESET acknowledgement to the sender. The RLC RESET procedure is used to RESET two RLC peer entities, which are operating in an AM. During the RESET procedure, the HFN in UTRAN and UE are synchronized. Two HFNs used for ciphering need to be synchronized, i.e., a DownLink (DL) HFN in the downlink and an UpLink (UL) HFN in the uplink. The RESET procedure can be initiated by either sender or receiver when one of the RESET conditions has occurred, i.e., if "no discard after MAXDAT number of transmissions" is configured and the number of retransmission attempts equals the value MAXDAT, or a status PDU with erroneous sequence number is received.

The other procedure used for initialization of peer RLC entities is RLC re-establishment, which is performed upon request by upper layers. The RLC re-establishment is applicable for AM or UM RLC entity. For UM, the whole RLC entity is re-established. For AM, upper layers may request re-establishment of the whole RLC entity or only the transmitting or receiving side of the RLC entity.

Figure 3:
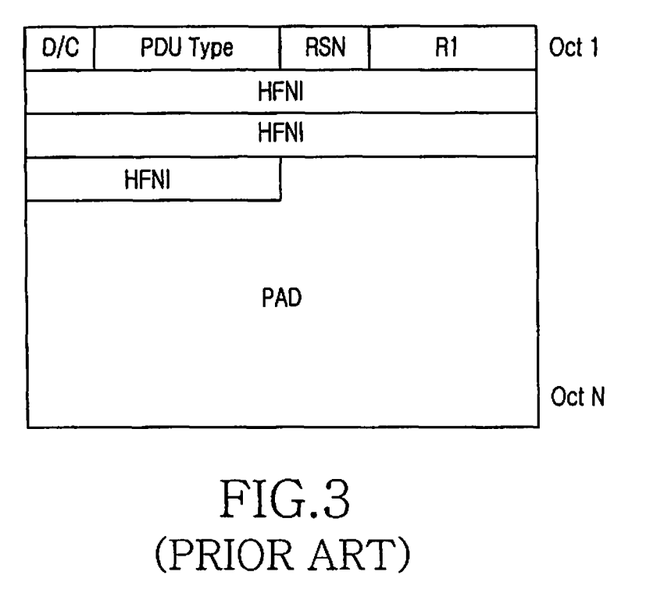
FIG. 3 illustrates a data structure of a conventional AM RESET PDU and a conventional RESET ACK PDU.

FIG. 3 illustrates the data structure of a regular AM RESET PDU and a regular RESET ACK PDU. A typical PDU includes a number of bytes (octets), where various bit-size fields are defined. For example, as illustrated in FIG. 3, the one-bit D/C field indicates whether the type of an AM PDU is a data or a control PDU. The 3-bits PDU type field indicates what kind of control type the PDU is, i.e., status, RESET, or RESET ACK PDU. The 1-bit Reset Sequence Number (RSN) is used to indicate the sequence of the transmitted RESET PDU. If this RESET PDU is a retransmission of an original RESET PDU, the RSN value is same as the original RESET PDU. Otherwise, the RSN value is changed to the next RSN value. The initial value of this field is zero. The value will be reinitialized every time the RLC is re-established, but will not be reinitialized when the RLC is RESET. RSN field in the RESET ACK PDU is filled with the same value as in RSN field of the received RESET PDU. The 3-bits R1 field is reserved for future functions. The 20-bits HFNI field is used to indicate the HFN, which helps to track the synchronization between a sender and a receiver.

A sender (or receiver) can be a UE or a UTRAN.

The PAD field is used to make ensure a minimum length of the PDU.

In general, a transmission from the UE to the UTRAN is referred to as an UL and the transmission from the UTRAN to the UE is referred to as a DL. Under certain conditions in an AM, either a sender or a receiver will initiate a RESET procedure if one sends too many retries, the number of retries has exceeded the maximum number of retransmission, or one receives a PDU with erroneous sequence number.

As per current 3GPP UMTS standards, when a RESET procedure has been initiated, it can only be ended upon reception of a RESET ACK PDU with the same RSN value as in the corresponding RESET PDU, upon request of re-establishment due to request of re-establishment (for the whole RLC entity or for only the transmitting or receiving side of the RLC entity), or release from upper layer.

Figure 4:
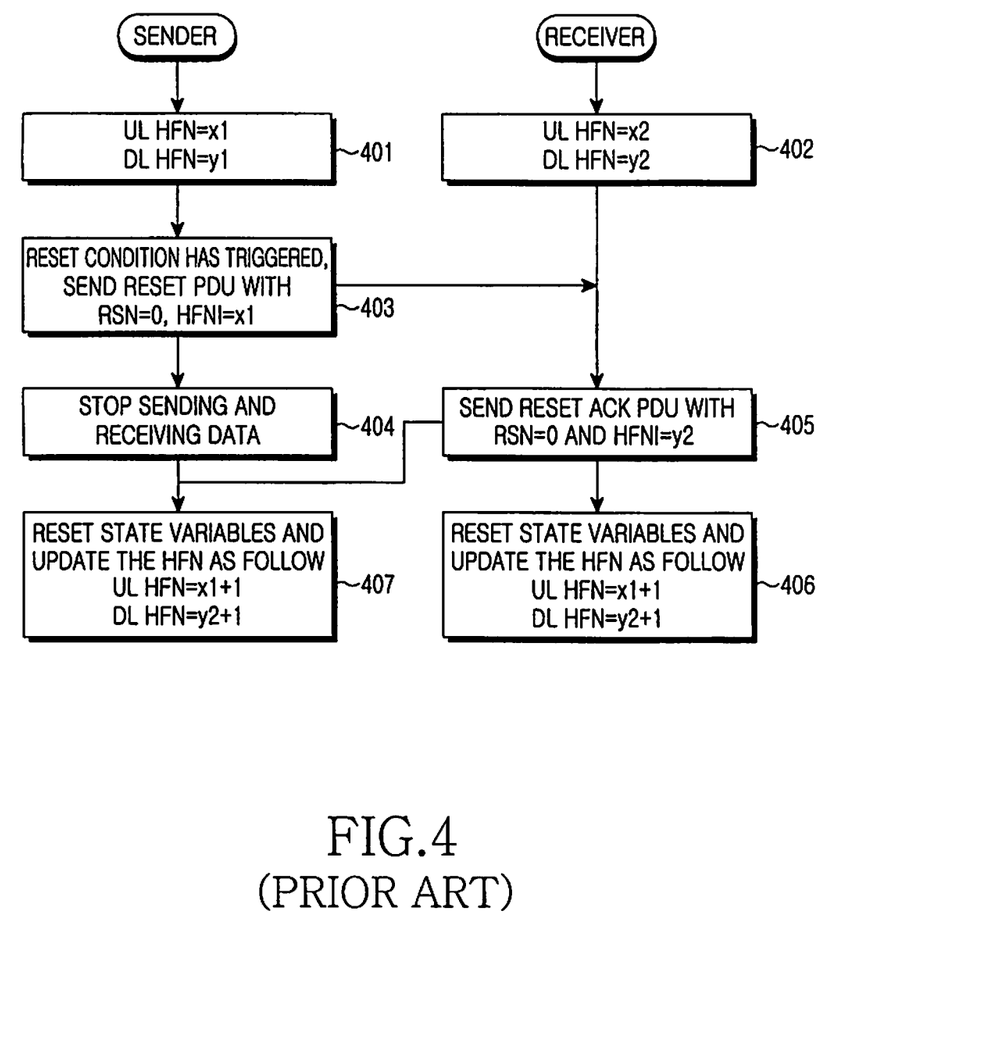
FIG. 4 illustrates a RLC RESET procedure.

FIG. 4 illustrates detailed RLC RESET procedure, considering UE as a sender and an UTRAN as a receiver. When a RESET condition occurs, the sender initiates a RESET procedure. Assuming that sender has UL HFN=x1 and DL HFN=y1(401) and the receiver has UL HFN=x2 and DL HFN=y2 (402), then the sender sends RESET PDU to receiver with HFNI=x1 and, RSN=0 (403) and enters RESET_PENDING_STATE (404), in which the sender will stop sending and receiving data. Upon receiving this RESET PDU, receiver will send a RESET ACK PDU with RSN=0 and HFNI=y2 to sender via lower layers (405) and will RESET its state variables and update its UL HFN and DL HFN by making DL HFN=y2+1 and UL HFN=x1+1 (406).

Upon receiving the RESET ACK PDU sender will also reset its state variables, update DL HFN=y2+1 and UL HFN=x1+1 (407), and end the RESET_PENDING_STATE. Consequently, HFN of sender and receiver will be synchronized with UL HFN=x+1 and DL HFN=y+1.

As will be described below, the prior art suffers from the synchronization problem due to delayed arrival of RESET ACK PDU at sender, after single-sided re-establishment terminates.

Figure 5:
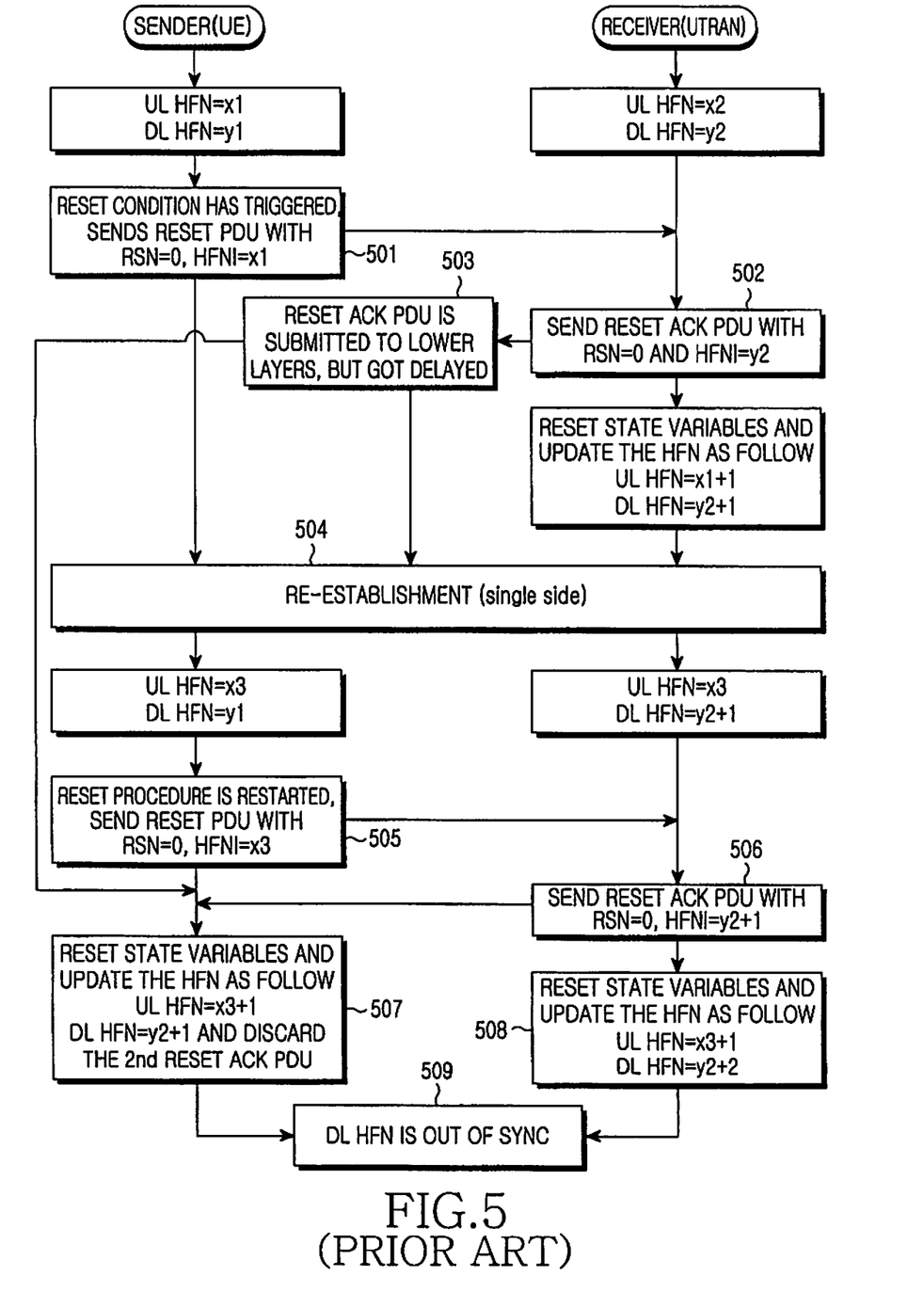
FIG. 5 illustrates a scenario including a delayed RESET ACK PDU after single sided re-establishment.

FIG. 5 illustrates a scenario of a delayed RESET ACK PDU, after a single sided re-establishment. More specifically, FIG. 5 illustrates the scenario of delayed RESET ACK PDU, after single sided re-establishment, wherein the sender has initiated the RESET procedure and sends the RESET PDU with RSN=0 and HFNI=x1 (501). Further, receiver responds with RESET ACK PDU with RSN=0 and HFNI=y2 and submits it to lower layers (502). However, the RESET ACK PDU is delayed due to some reason, e.g., because of multiple HARQ retransmissions at MAC-hs (503). Single sided re-establishment (Transmission (TX) side of UE and Reception (RX) side of UTRAN) occurs and therefore, new values of the UL HFN are configured for TX side for UE and RX side for UTRAN (504).

As per 3GPP standards, if a single sided RLC re-establishment is initiated while an RLC RESET procedure is ongoing, then the RLC RESET procedure is aborted and the RLC RESET procedure is restarted after re-establishment terminates (505). In this new RLC RESET procedure, the RSN is set to zero. Wherein sender again sends RESET PDU with RSN=0 and HFNI=x3. Further, receiver responds with new RESET ACK PDU with RSN=0 and HFNI=y2+1 (506). Sender is in RESET_PENDING_STATE and when it receives the delayed RESET ACK PDU with RSN=0 and HFNI=y2, which was sent before re-establishment, it updates its HFN value accordingly and comes out of RESET_PENDING_STATE (507). Thereafter, when it receives the second RESET ACK PDU with RSN=0 and HFNI=y2+1, it discards it.

Consequently, DL HFN will be out of synchronization as at the sender side HFNs are with UL HFN=x3+1, DL HFN=y2+1 (507) and the receiver side with UL HFN=x3+1, DL HFN=y2+2 (508). Similarly, for the above-described scenario, DL HFN will be out of synchronization when single sided re-establishment (RX side of UE and TX side of UTRAN) happens (509).

As per the current standards, if double-sided RLC re-establishment is initiated while an RLC RESET procedure is ongoing, then the RLC RESET procedure is aborted and RLC RESET procedure is not restarted after re-establishment terminates. The sender entity after re-establishment, therefore, is not in RESET_PENDING_STATE and will discard this RESET ACK PDU. Consequently, the above-described HFN de-synchronization problem does not occur in the double-sided RLC re-establishment case.

Additionally, the prior art undergoes a synchronization problem due to delayed arrival of RESET PDU at receiver, after re-establishment terminates, in the double sided RLC re-establishment and in the single sided re-establishment.

Figure 6:
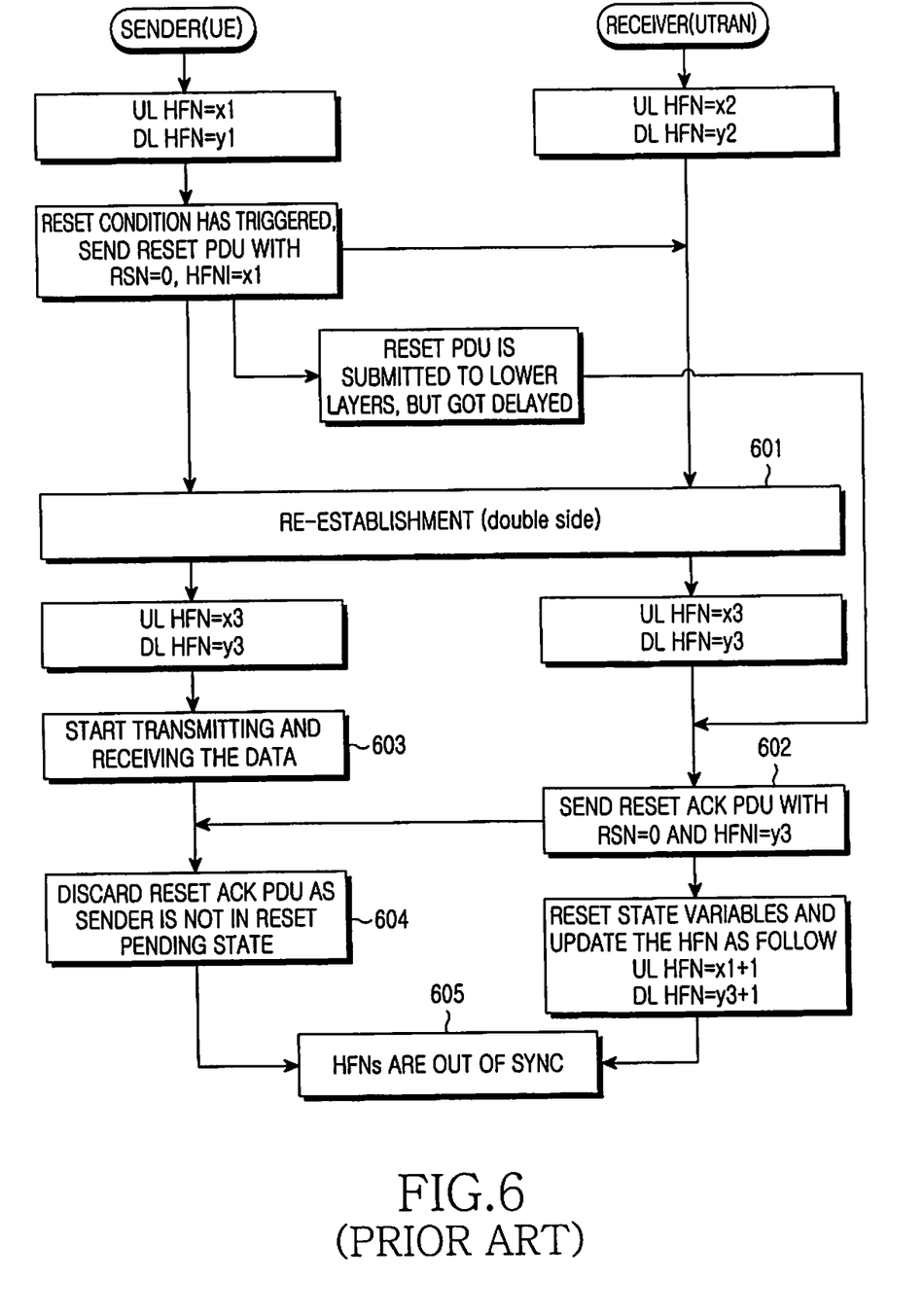
FIG. 6 illustrates a scenario including delayed RESET PDU after double-sided re-establishment.

FIG. 6 illustrates the scenario of delayed RESET PDU after double-sided re-establishment. In a double-sided RLC re-establishment (601), if the sender has already submitted RESET PDU to HARQ, before the RESET procedure is aborted, it is possible that this PDU is delivered to peer RLC entity, after the re-establishment has terminated. In such a scenario, the peer RLC entity will update its HFN according to received RESET PDU and respond with a RESET ACK PDU (602). However, the sender entity after re-establishment has not restarted the RESET procedure and therefore, is not in a RESET_PENDING_STATE and will merely discard this RESET ACK PDU (604). That is, the sender has already started transmitting and receiving data (603). Consequently, the HFNs of the sender and the receiver will not be in synchronization (605).

Figure 7:
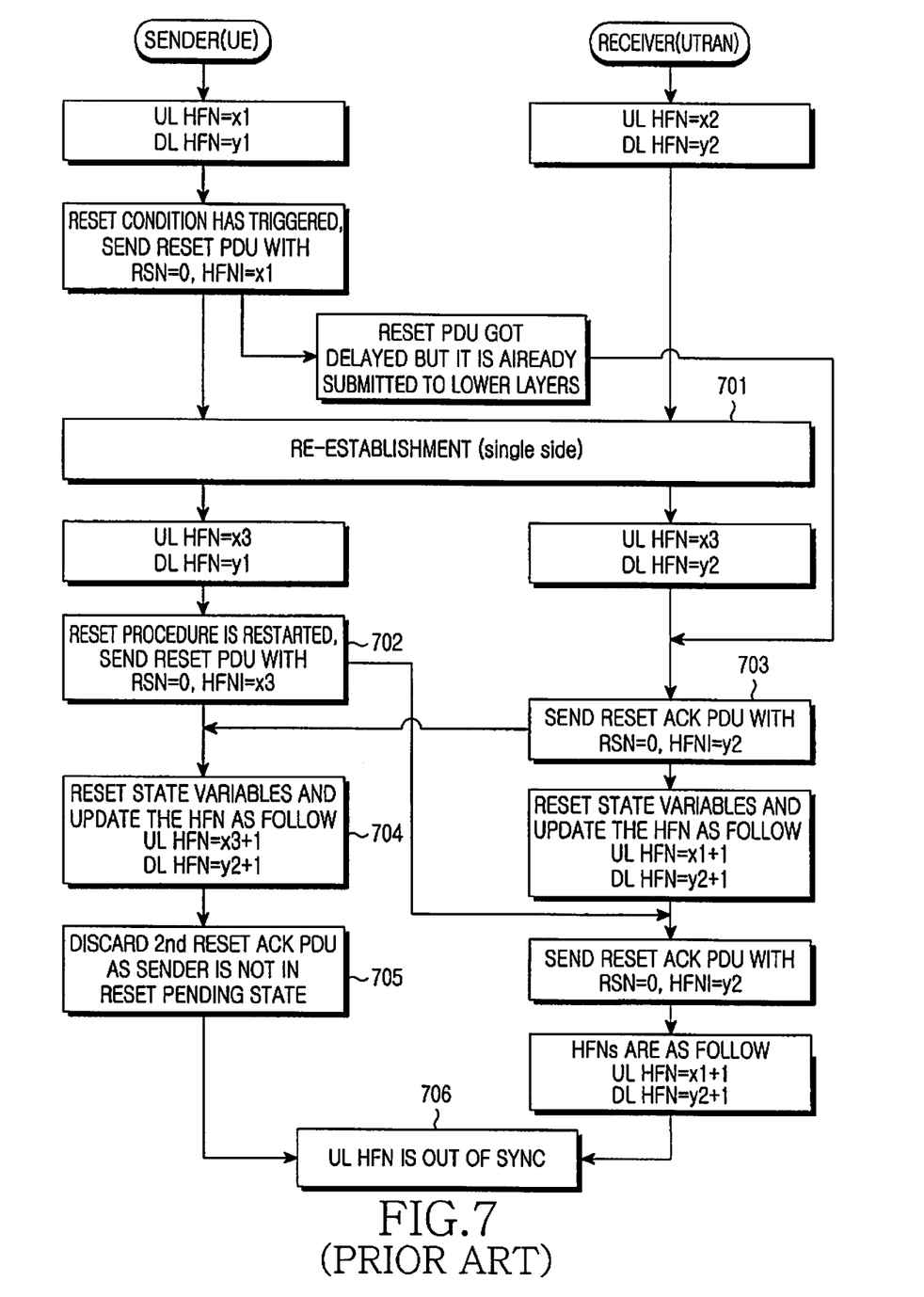
FIG. 7 illustrates a scenario including delayed RESET PDU after single sided re-establishment.

FIG. 7 illustrates a scenario of delayed RESET PDU after a single sided re-establishment. In case of single-sided re-establishment (701), because the sender has restarted the RESET procedure and transmitted a new RESET PDU (702), it would accept the RESET ACK PDU corresponding to delayed RESET PDU (703) and come out of RESET_PENDING_STATE (704). Hence, when the RESET ACK is received corresponding to new RESET PDU, it will be discarded (705). Hence, the sender and receiver will be out of synchronization (706).

U.S. Patent Application No. 2006/0281413, entitled "Establishing Radio Link Control in Wireless Communication Networks", by Burbidge et al., describes a wireless communication terminal including a radio transceiver and a radio link control entity that re-initiates a radio link control RESET procedure when the transceiver receives a message containing an instruction to change an uplink or downlink protocol data unit size during an ongoing radio link control RESET procedure. For example, the radio access network may initiate an UL or DL PDU size change before terminal receives an acknowledgement that a previously initiated radio link control RESET procedure is completed. The radio link control entity restarts a radio link control RESET timer upon re-initiating the radio link control RESET procedure, after re-establishing radio link control.

Burbidge proposes a method and system for establishing and resetting radio link control in wireless communication networks. According to Burbidge, if a single-sided RLC establishment occurs during a pending RLC RESET procedure, the RLC RESET procedure is restarted. Further, the RSN sent in the RESET PDU, after the re-establishment is not initialized to zero, and instead, the RSN is set to a value of a last used RSN incremented by one. However, Burbidge does not explicitly mention toggling of the RSN value in the RESET PDU. Further, Burbidge does not disclose any other method for synchronizing HFN frames after re-establishment of an RLC entity. Therefore, a method is needed to addresses these issues and to avoid the de-synchronization of HFNs.

SUMMARY OF THE INVENTION

The present invention has been designed to solve at least the above-identified problems in the prior art, and to provide at least the advantages described below. Embodiments of the present invention provide methods for preventing HFN de-synchronization due to the interaction between a RESET procedure and re-establishment procedure in the RLC layer, which handles the ciphering functionality, of a wireless communication system.

In accordance with an embodiment of the present invention, a method for HFN synchronization in a wireless communication system is provided. The method includes: toggling an RSN bit value in a RESET PDU after single sided re-establishment; transmitting the RESET PDU with the toggled RSN bit to a receiver; and updating HFN value according to a RESET ACK PDU.

In accordance with an embodiment of the present invention, a method for HFN synchronization in a wireless communication system is provided. The method includes: introducing a new variable RC in reserved portion of RESET PDU and RESET ACK PDU; and incrementing RC when RLC entity is re-established.

In accordance with an embodiment of the present invention, a method for HFN synchronization in a wireless communication system is provided. The method includes: deferring a restart of a RESET procedure, after single sided re-establishment; deferring a new RESET procedure, after both sided re-establishment by a predetermined duration; the sender and the receiver maintaining a timer called RESET_DEFER_TIMER; and discarding any received RESET PDU or RESET PDU ACK in this predetermined duration.

In accordance with an embodiment of the present invention, a method for HFN synchronization in a wireless communication system is provided. The method includes: flushing soft buffer for all configured HARQ processes; flushing re-ordering buffer of HARQ entity which contains a RLC PDU from a re-established RLC entity; and preventing HARQ/MAC layer entity from performing unnecessary transmissions or receptions.

In accordance with an embodiment of the present invention, a method for HFN synchronization in a wireless communication system is provided. The method includes: restarting the RESET procedure after both sided re-establishment terminates; sending RESET PDU with a toggled RSN value; and comparing the RSN value in received RESET ACK PDU with the RSN value in the RESET PDU.

BRIEF DESCRIPTION OF THE DRAWINGS

The above and other aspects, features, and advantages of the embodiments of the present invention will become more apparent from the following description when taken in conjunction with the accompanying drawings in which.

DETAILED DESCRIPTION OF EMBODIMENTS OF THE INVENTION

Embodiments of the present invention will now be described with reference to the accompanying drawings. In the following description, a detailed description of known functions and configurations incorporated herein has been omitted for conciseness.

Embodiments of the present invention provide methods for preventing HFN de-synchronization due to an interaction between a RESET procedure and a re-establishment procedure in RLC layer of a wireless communication system, i.e., provide new methods for maintaining synchronization during the RESET procedure in the wireless communication system.

Figure 8:
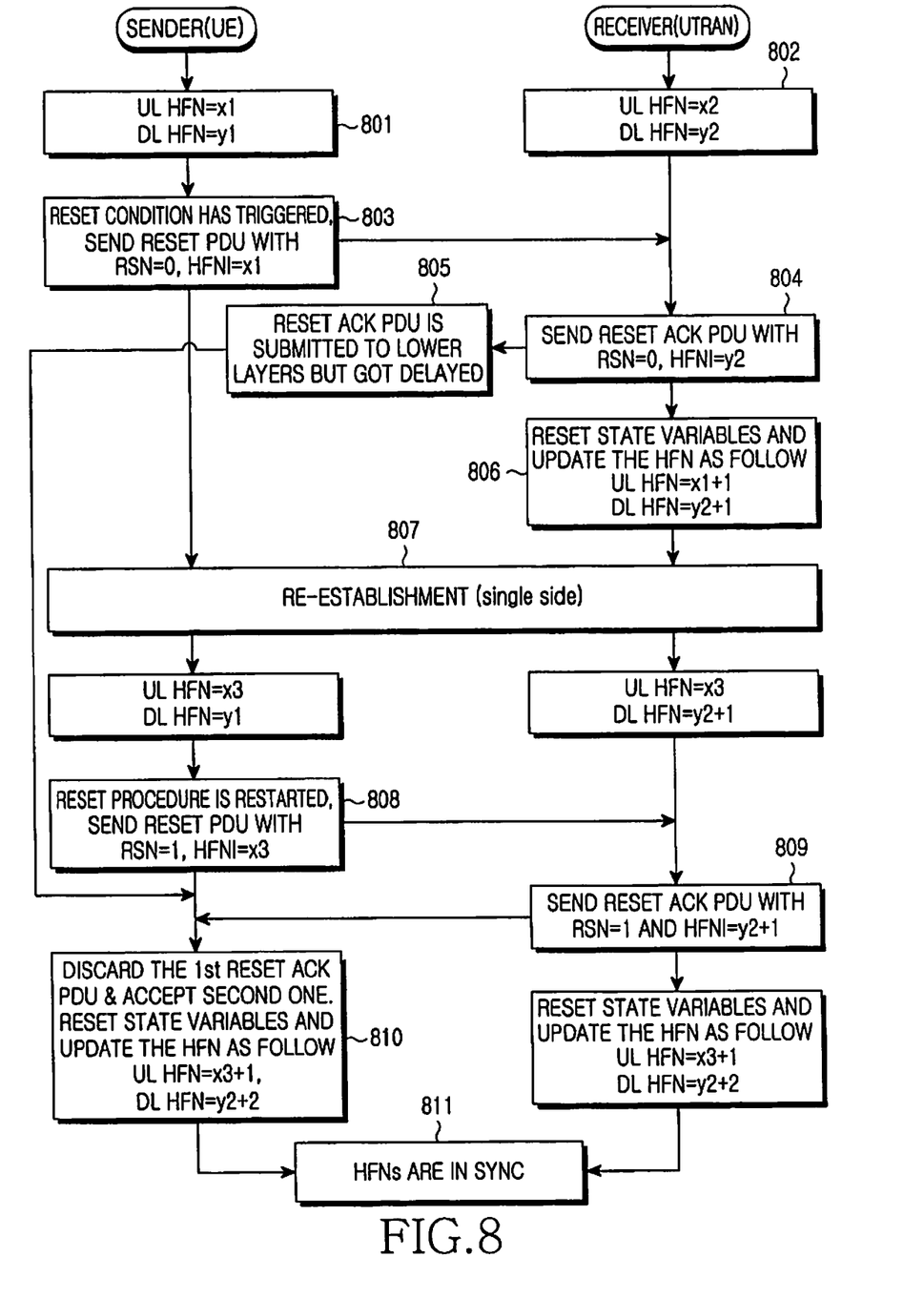
FIG. 8 illustrates an RLC RESET to achieve HFN synchronization based on toggling of RSN value.

FIG. 8 illustrates an RLC RESET for performing HFN synchronization based on a toggling of RSN value. The UE and UTRAN can be either a sender or a receiver, respectively. In accordance with an embodiment of the present invention, an RSN value included in a RESET PDU is toggled when single-sided RLC re-establishment occurs. After the single-sided re-establishment terminates, the RESET procedure is restarted and a RESET PDU is transmitted with the toggled RSN bit. This method is applicable to re-establishment of a single side of an RLC entity.

As per current 3GPP standards the value of an RSN is initialised when re-establishment occurs either for both sides or for single side (transmitting or receiving) of RLC entity. To avoid HFN de-synchronization, the RSN value is not initialized when single sided RLC re-establishment occurs. After single sided re-establishment terminates, a RESET procedure is restarted and a RESET PDU is transmitted with a toggled RSN bit, i.e., if the bit was zero before single sided re-establishment, then after single sided re-establishment, it is toggled to one, and vice versa.

Referring to FIG. 8, a sender has a UL HFN=x1 and a DL HFN=y1 (801), while a receiver has a UL HFN=x2 and a DL HFN=y2 (802). A RESET condition is triggered, the sender sends the first RESET PDU with RSN=0 and HFNI=x1 to the receiver through a designated connecting channel (803). Further, the receiver responds with RESET ACK PDU with RSN=0 and HFNI=y2 (804), and submits to lower layers (805). If the RESET procedure is ongoing and upper layer initiates a single sided re-establishment for RLC entity (807), RLC aborts the RESET procedure and re-establish the entity wherein all protocol state variables are RESET (806) but RSN value is toggled. After single sided re-establishment terminates, the sender restarts RESET procedure and sends new RESET PDU with RSN=1 and HFNI=x3 (808). The receiver responds with RESET ACK PDU with RSN=1 and HFNI=y2+1, and submits to lower layers, checking the RSN before accepting RESET ACK PDU (809). Accordingly, the sender accepts the new RESET ACK PDU with RSN=1 and HFNI=y2+1, and discards the delayed RESET ACK PDU (RSN=0, HFNI=y2) (810). Finally, the sender updates its HFN value according to new RESET ACK PDU. Therefore, the HFNs are in synchronization (811).

Figure 9:
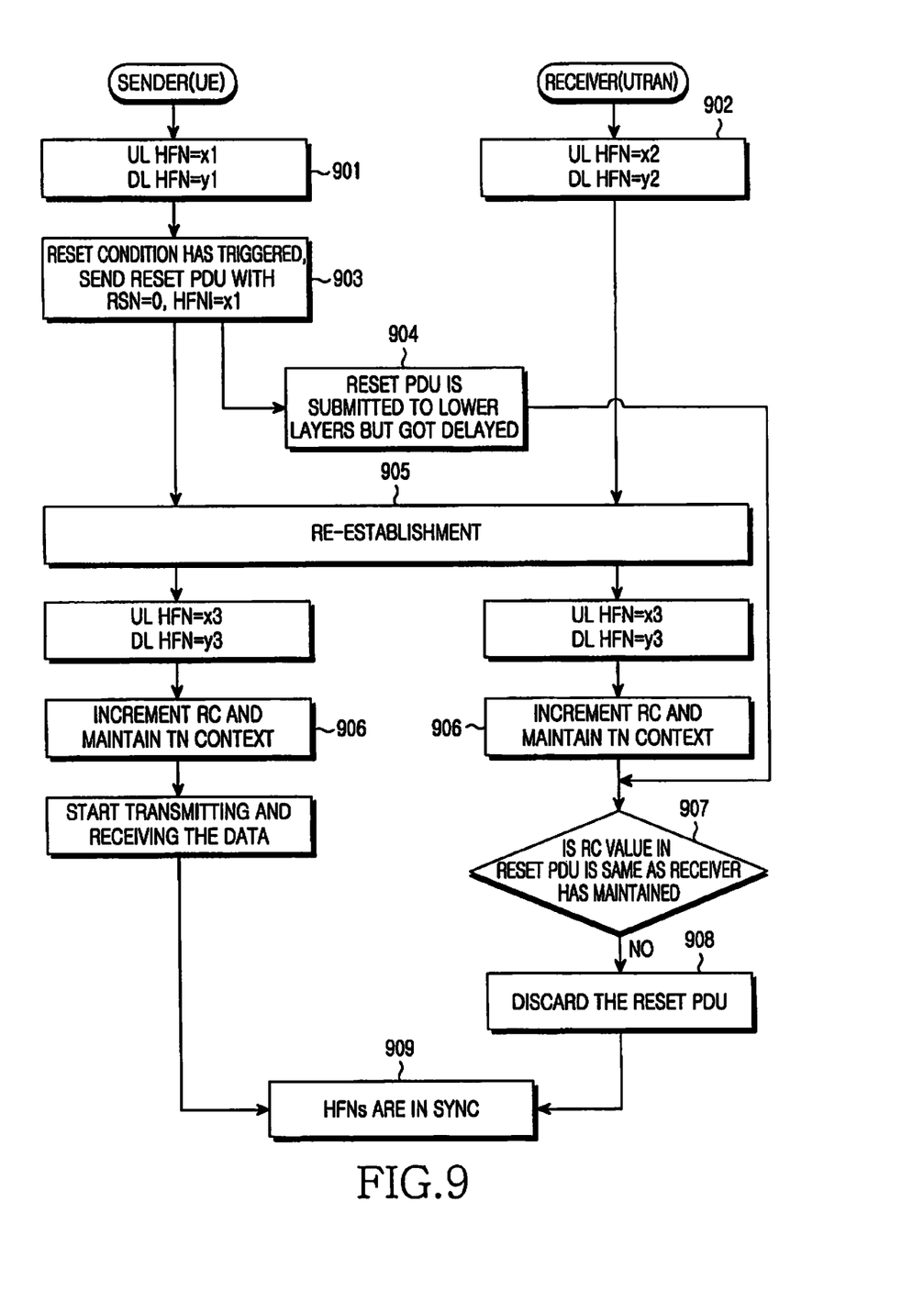
FIG. 9 illustrates HFN synchronization during delayed arrival of RESET PDU at receiver.

FIG. 9 illustrates HFN synchronization during a delayed arrival of a RESET PDU at a receiver. As described above, the UE and UTRAN can be either a sender or a receiver, respectively. In accordance with an embodiment of the present invention, a new variable RC is introduced in the reserved portion R1 of the RESET PDU as well as the RESET ACK PDU. The RC variable is incremented every time the RLC entity is re-established. This method illustrated in FIG. 9 is applicable to a single side as well as doubled side re-establishment of RLC entities.

More specifically, the new field RC is introduced in a RESET and a RESET ACK PDU. The RC field may be, e.g., 3 bits long, and is preferably located in a reserved portion R1 in the RESET and the RESET ACK PDU, which is currently unused in 3GPP standards. The sender and the receiver RLC entity each maintains in its context a protocol variable RC, which is initialized to zero, once an entity is created and is incremented, whenever RLC entity is re-established. The sender and receiver RLC entities will discard any RESET/RESET ACK PDU with an RC not having value RC not corresponding to a predetermined RC. Once the RC value reaches a maximum value, e.g., 7, it returns to zero on a next re-establishment.

Although the RC field length is described above as being 3 bits, the RC field length should not be limited to this specific length, e.g., it may 1 bit, 2 bits, etc.

As illustrated in FIG. 9, the sender has a UL HFN=x1 and a DL HFN=y1 (901), and the receiver has a UL HFN=x2 and a DL HFN=y2 (902). When a RESET condition is triggered, the sender sends the first RESET PDU with RSN=0, HFNI=x1, and RC=0 to lower layers of the receiver (903). However, the reset PDU is delayed through a designated connecting channel when some RESET condition is detected (904). If the RESET procedure is ongoing and upper layer initiates a single or double sided re-establishment for peer RLC entities, the RESET procedure is aborted and re-establishment occurs (905). The RC value is incremented by one, both in sender and receiver contexts (906). Further, the receiver, before accepting RESET PDU, checks the RC value in this PDU with one it has maintained in context (907). If the RC values do not match, the receiver discards the delayed RESET PDU with RSN=0, HFNI=x1, and RC=0 (908). Accordingly, the HFNs are maintained in synchronization (909).

Figure 10:
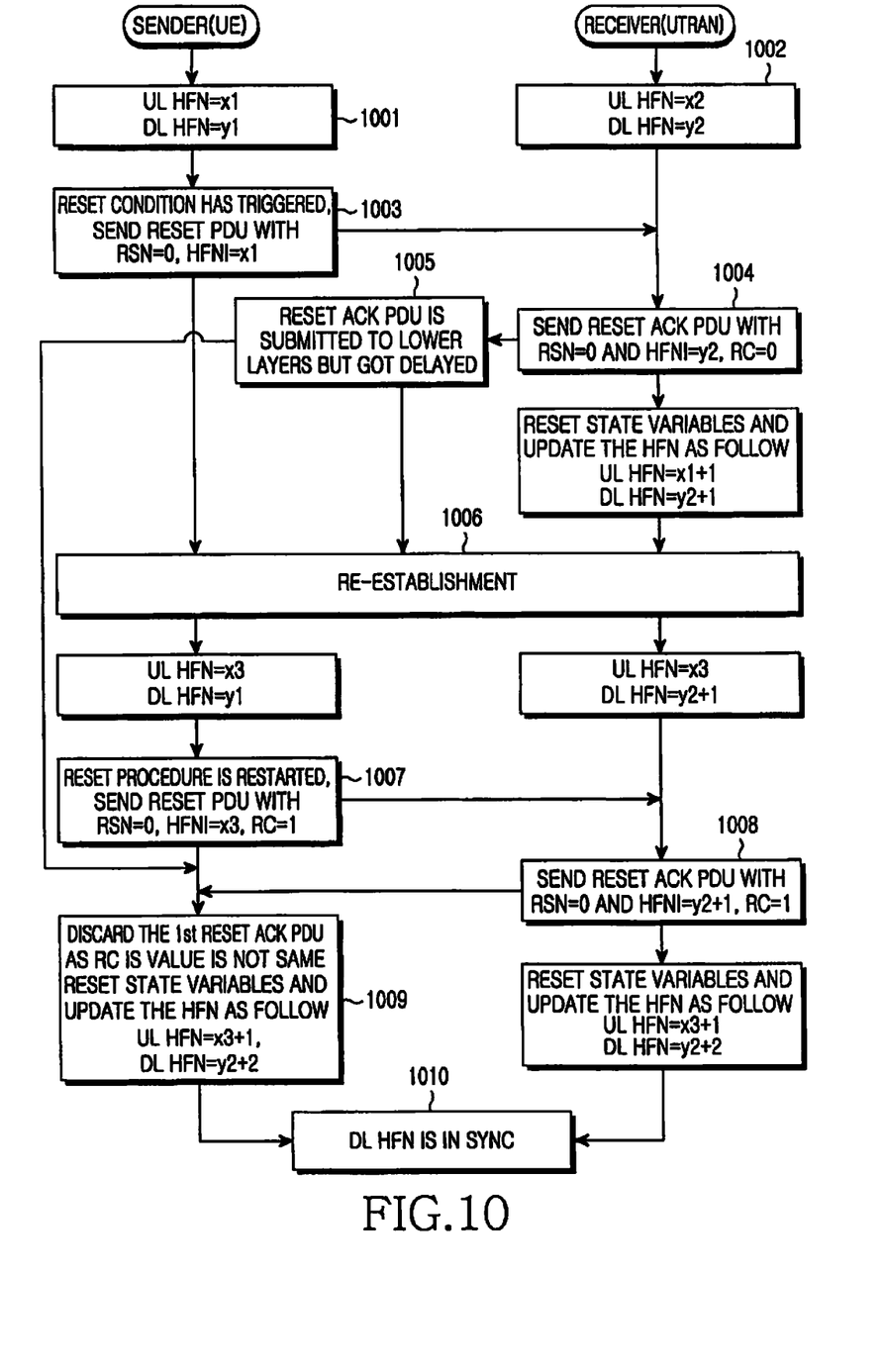
FIG. 10 illustrates HFN synchronization during delayed arrival of RESET ACK PDU at sender.

FIG. 10 illustrates HFN synchronization during a delayed arrival of a RESET ACK PDU at a sender. Referring to FIG. 10, a sender has a UL HFN=x1 and DL HFN=y1 (1001), and a receiver has UL HFN=x2 and DL HFN=y2 (1002). When a RESET condition triggered, the sender sends the first RESET PDU with RSN=0, HFNI=x1, and RC=0 to the receiver through a designated connecting channel (1003). Further, receiver responds with RESET ACK PDU with RSN=0, HFNI=y2, and RC=0 (1004), and submits to lower layers (1005), which is delayed. If the RESET procedure is ongoing and upper layers initiate a single sided re-establishment for peer RLC entities, the RESET procedure is aborted and re-establishment occurs (1006). The RC value is incremented by one both in sender and receiver contexts. The sender restarts a RESET procedure and sends a RESET PDU with RSN=0, HFNI=x3, and RC=1 (1007). The receiver responds with a RESET ACK PDU with RSN=0, HFNI=y2+1, and RC=1 (1008), and submits to lower layers. Further, the sender, before accepting RESET ACK PDU checks RSN as well as RC value. Accordingly, when the RC values correspond, the sender accepts the new RESET ACK PDU with RSN=0, HFNI=y2+1, and RC=1 and discards the delayed RESET ACK PDU with RSN=0, HFNI=y2, and RC=0 (1009). The sender updates its HFN value according to new RESET ACK PDU. Accordingly, the HFNs are in synchronization (1010).

Figure 11:
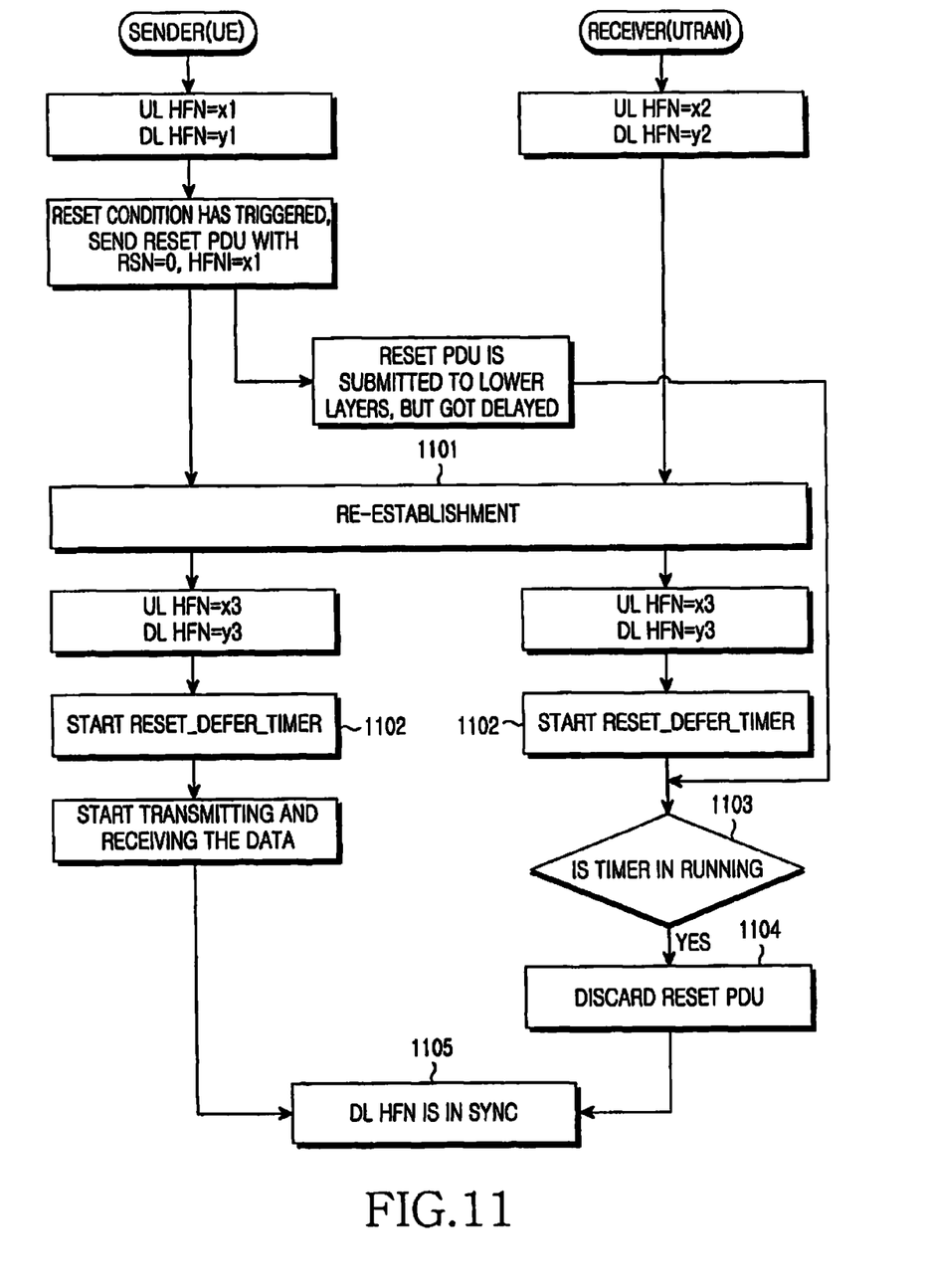
FIG. 11 illustrates an RLC RESET for performing HFN synchronization based on a RESET defer timer mechanism.

FIG. 11 illustrates an RLC RESET for performing HFN synchronization based on a RESET defer timer mechanism. As described above, the UE and UTRAN can be either a sender or a receiver, respectively.

In accordance with an embodiment of the present invention, after re-establishment of an RLC entity, the restarting of RESET procedure is deferred until a predetermined time elapses. Thus, the sender sends no RESET PDU in this duration. Both the sender and the receiver maintain a timer called RESET_DEFER_TIMER. This method is applicable to both single and double sided re-establishment of RLC entities.

More specifically, after, for example, the single sided re-establishment terminates (1101), the restarting of RESET procedure is deferred until a predetermined time elapses and hence, no new RESET PDU is transmitted by the sender in this duration. For double-sided re-establishment, no new RESET procedure is started at the sender or receiver in this predetermined duration. This predetermined duration accounts for the maximum transmission delay, which could be there between the sender and receiver because of the HARQ configuration and multiple HARQ retransmissions and a timer RESET_DEFER_TIMER is used to track of it.

Referring to FIG. 11, a RESET_DEFER_TIMER is started after re-establishment (1102). If the sender receives any RESET ACK PDU before RESET_DEFER_TIMER expiry, which would be the one sent before reestablishment, it will discard it. Similarly, as specifically illustrated in FIG. 11, if receiver receives any RESET PDU before RESET_DEFER_TIMER expiry (1103), it is discarded (1104). Hence, HFN synchronization can be achieved (1105).

In accordance with an embodiment of the present invention, when higher layers have re-established the RLC entity, an indication is sent to MAC-hs layer entity to flush soft buffer for all configured HARQ processes and re-ordering buffer of HARQ entity which contain a RLC PDU from the re-established RLC entity. As PDUs are discarded from transmitting as well as receiving buffer of the MAC layer entity such that the above described problem will not occur, and thus, HFN synchronization is achieved. The method is applicable for both single and double sided RLC re-establishment.

In accordance with another embodiment of the present invention, after the re-establishment terminates, the RESET procedure is restarted at the sender and RSN value sent in the RESET PDU is toggled, i.e., if the RSN value was zero before re-establishment, then after re-establishment, it is toggled to one, and vice versa. The receiver responds with the RESET ACK PDU having a same RSN value as received in this RESET PDU. Thereafter, sender discards the RESET ACK PDU, which is not having the same RSN value. This method is applicable to double-sided re-establishment of an RLC entity.

As described above, the various embodiments of the present invention enhance the robustness of the link layer RESET procedure in wireless communication system and maintain the security parameters such as HFNs in a synchronization in which interaction of the re-establishment of layer entity handling ciphering functionality, e.g., in the RLC layer in 3GPP UMTS standards with the on-going entity RESET procedure could cause loss of synchronization between sender and receiver entities. Accordingly, the various embodiments of the invention prevent the otherwise regular synchronization loss of the HFNs.

While the present invention has been shown and described above with reference to various embodiments thereof, it will be understood by those skilled in the art that various changes in form and details may be made therein without departing from the spirit and scope of the present invention as defined by the appended claims.

What is claimed is:

1. A method for Hyper Frame Number (HFN) synchronization in a wireless communication system, comprising:
    if single sided re-establishment of a Radio Link Control (RLC) entity occurs during a pending RLC reset procedure, aborting the pending RLC reset procedure and performing the single sided re-establishment of the RLC entity;
    restarting the pending RLC reset procedure and toggling a 1-bit Reset Sequence Number (RSN) value;
    transmitting a RESET Packet Data Unit (PDU) with the toggled RSN value to a receiver;
    receiving a RESET ACKnowledgement (ACK) PDU for the RESET PDU with the toggled RSN value from the receiver;
    checking the toggled RSN value included in the received RESET ACK PDU; and
    updating an HFN value according to the toggled RSN value and an HFN value included in the received RESET ACK PDU,
    wherein toggling the 1-bit RSN value comprises:
    toggling the RSN value to '1' if the RSN value is '0' before the single sided re-establishment; and
    toggling the RSN value to '0' if the RSN value is '1' before the single sided re-establishment.

2. The method of claim 1, wherein the single sided re-establishment of the RLC entity is performed when DownLink (DL) or UpLink (UL) PDU size changes for the RLC entity.

3. The method of claim 1, further comprising:
    accepting the received RESET ACK PDU and discarding a delayed RESET ACK PDU based on the checking result.

4. A method for Hyper Frame Number (HFN) synchronization in a wireless communication system, comprising:
    performing double-sided re-establishment of a Radio Link Control (RLC) entity during a pending RLC reset procedure;
    restarting the pending RLC RESET procedure;
    sending a RESET Packet Data Unit (PDU) including a toggled Reset Sequence Number (RSN) value;
    receiving a RESET ACKnowledgement (ACK) PDU for the RESET PDU;
    comparing an RSN value in the received RESET ACKnowledgement (ACK) PDU with the toggled RSN value included in the RESET PDU; and
    updating an HFN value according to the comparing result,
    wherein the toggled RSN value is 1-bit, the toggled RSN value is '1' if a RSN value is '0' before the double sided re-establishment and the toggled RSN value is '0' if the RSN value is '1' before the double sided re-establishment.

5. The method of claim 4, wherein a receiver responds with the RESET ACK PDU having a same RSN value as received in the RESET PDU and updates its state variable and HFN accordingly.

6. The method of claim 4, further comprising:
    accepting the received RESET ACK PDU and discarding a delayed RESET ACK PDU based on the comparing result.

* * * * *